United States Patent [19]

Dawson

[11] 4,235,036
[45] Nov. 25, 1980

[54] FISHING LINE SIGNAL DEVICE

[76] Inventor: Titus C. Dawson, 3322 Glen Haven, Dallas, Tex. 75211

[21] Appl. No.: 8,414

[22] Filed: Feb. 1, 1979

[51] Int. Cl.³ .............................................. A01K 97/12
[52] U.S. Cl. ......................................................... 43/17
[58] Field of Search ........................... 43/16, 17, 17.5; 340/546, 548

[56] References Cited

U.S. PATENT DOCUMENTS

| | | | |
|---|---|---|---|
| 2,560,905 | 7/1951 | Teel | 43/17 |
| 2,922,243 | 1/1960 | Weaver | 43/17 |
| 2,948,076 | 8/1960 | Patricello | 43/17 |
| 3,058,250 | 10/1962 | Thomas | 43/17 |

Primary Examiner—Nicholas P. Godici
Assistant Examiner—K. Bradford Adolphson
Attorney, Agent, or Firm—Wofford, Fails & Zobal

[57] ABSTRACT

An apparatus for signaling if a fish bites a fishing line. The apparatus includes a housing containing a contact bar and an arm. The contact bar and arm are connected to a battery powered electrical circuit that sounds an alarm and energizes a lamp if they contact each other. The arm is biased into contact with the contact bar in the normal state. A cord is secured between the end of the arm and the fishing rod. The fishing rod is positioned by a rod holder so that it maintains enough tension in the cord to draw the arm out of contact with the contact bar. Should a fish bite, the end of the rod will dip, releasing enough tension for the arm to contact the contact bar to cause a signal which may be both visual and audible.

6 Claims, 3 Drawing Figures

FISHING LINE SIGNAL DEVICE

BACKGROUND OF THE INVENTION

1. Field of the Invention

This invention relates in general to devices for signaling the bite of a fish on a fishing line.

2. Description of the Prior Art

Various devices have been proposed for signaling should a fish bite a fishing line. Some of these require stringing the line through a switch means that trips in response to a tug on the line. Examples of this are shown in U.S. Pat. Nos. 2,978,828; 2,869,275; 3,913,255; 3,134,187; 3,835,568; 3,389,489; and 3,559,327. Other patents disclose rod holders that provide a signal when titled, such as U.S. Pat. Nos. 3,470,647; 3,739,514; and 3,628,275. While these proposals may be workable, a less expensive and simpler device is desirable.

SUMMARY OF THE INVENTION

It is the general object of this invention to provide an improved device for detecting the bite of a fish on a fishing line.

It is a further object to provide an improved device for detecting the bite of a fish on a fishing line that does not require stringing the fishing line through a switch.

It is a further object to provide a device for detecting the bite of a fish on a fishing line that does not require a specially constructed rod holder.

In accordance with these objects, a detecting apparatus is provided that contains an arm and a contact bar that closes the circuit to provide a signal should a fish bite. The arm is biased into electrical contact with the contact bar in its natural state. A cord is secured between the arm and the fishing rod. The fishing rod is held by a conventional rod holder in a position that maintains enough tautness in the cord to keep the arm from contacting the bar. Should a fish bite, the rod will dip, allowing the arm to contact the contact bar to close the circuit.

DESCRIPTION OF THE PREFERRED EMBODIMENTS

Figure 1:
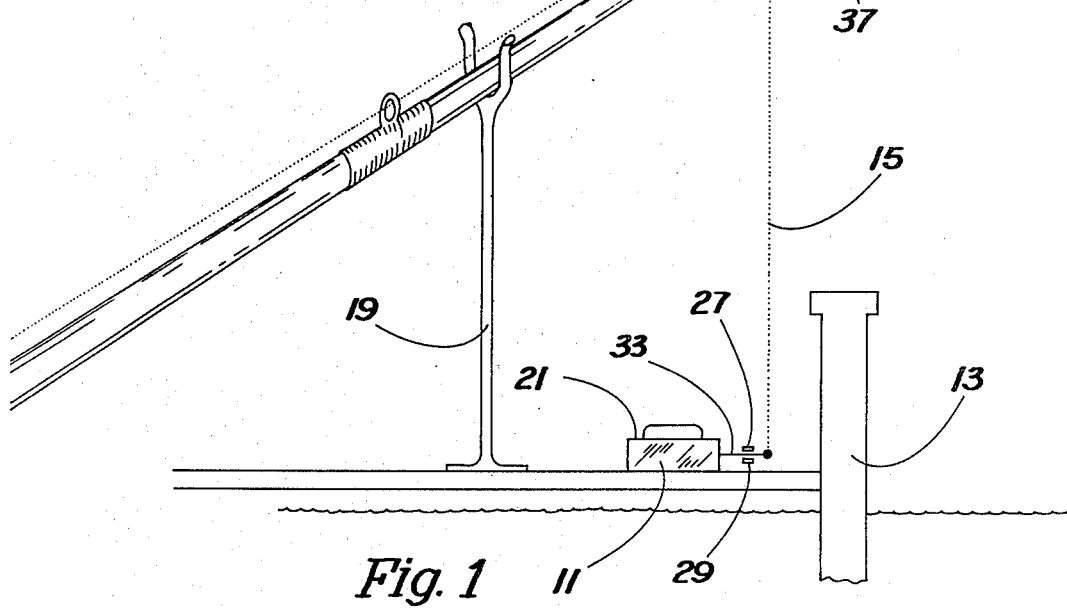
FIG. 1 is a side elevational view of a fish detecting device constructed in accordance with this invention, shown attached to a fishing rod.

Referring to FIG. 1, the fish detecting device 11 is shown in a typical position on a pier or dock 13, and secured by a cord 15 to a conventional fishing rod 17. Fishing rod 17 is supported by conventional rod holder or stand 19, which could be of various types.

Figure 3:
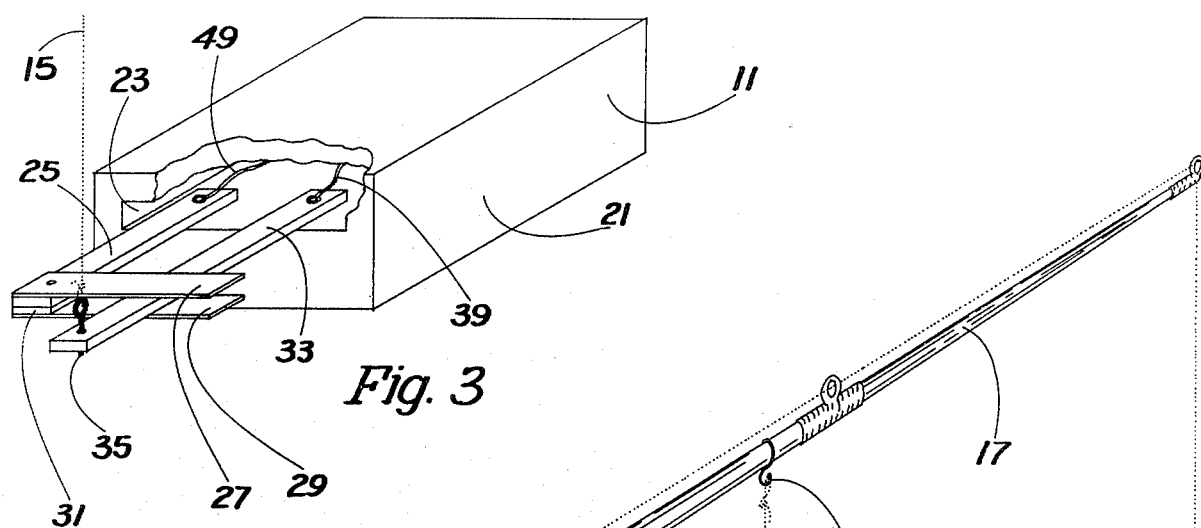
FIG. 3 is a partial perspective view of the fish detecting device of FIG. 1.

As shown also in FIG. 3, the fish detecting device 11 includes a case or housing 21 that has a slot 23 on one end. A contact bar 25 is mounted at one end to the inside of the housing. Contact bar 25 has a free or unsupported end that extends out through slot 23. At the free end, two lateral members 27, 29 extend laterally at right angles with respect to contact bar 25. The lateral members are parallel with each other and vertically separated by a spacer 31. Lateral members 27 and 29 form a part of the contact bar 25, and comprise flat metal strips in electrical contact with each other and with the contact bar.

An arm 33 is also mounted in housing 21. Arm 33 is cantilevered from its inner end in the housing, with its outer end protruding outward through the slot 23 and between the lateral members 27, 29 of the contact bar 25. Arm 33 is a flat metal strip that is resilient and electrically conductive. It is mounted so that it is normally in contact with the lower lateral portion 29. An eyelet 35 is mounted at the free end of arm 33. Cord 15 is tied to eyelet 35 and it adapted to be looped over hook 37 secured to rod 17.

Figure 2:
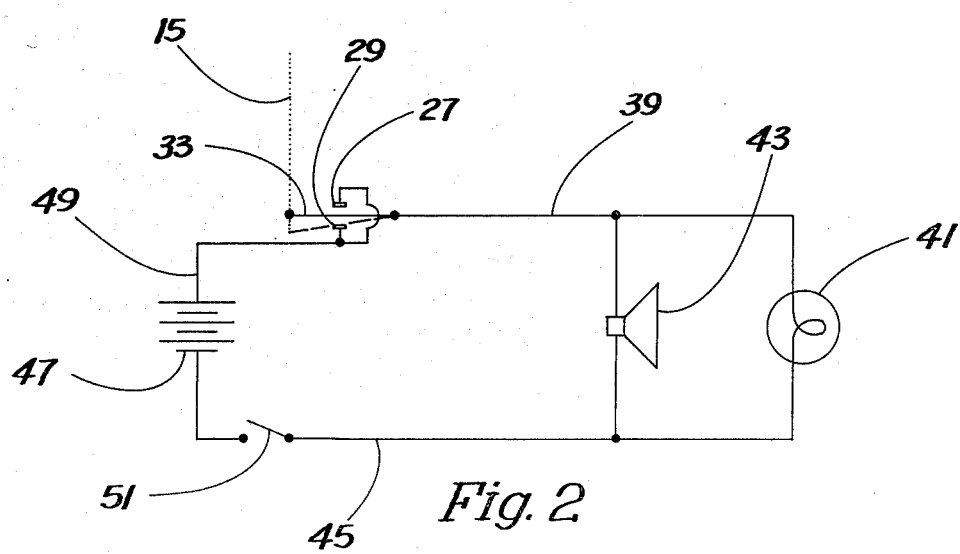
FIG. 2 is the electrical schematic for the fish detecting device of FIG. 1.

As shown in FIG. 2, a wire 39 leads from the inner end of arm 33 to one side of lamp 41 and a vibrating buzzer 43. The opposite side of lamp 41 and vibrating buzzer 43 are connected by a wire 45 to one side of a battery 47. A wire 49 leads from the opposite side of battery 47 to the contact bar 25 (See FIG. 2) and hence to the lateral members 27, 29. A manual on/off switch 51 is placed in wire 45.

In operation, the detecting device 11 is placed on the ground or pier 13. A conventional fishing rod 17, typically of fiberglass construction, is mounted above the detector by a rod holder 19 of any conventional design. Cord 15 is looped to the hook 37 attached to rod 17. Rod 17 is positioned so as to draw the arm 33 away from the contact bar lower member 29, as shown in FIG. 2 and FIG. 3. Switch 51 is turned on to show that there is no electrical contact between arm 33 and the contact bar lower member 29, or contact bar upper member 27. If too much tension is placed in the cord 15, it will cause arm 33 to contact the contact bar upper member 27.

When a fish bites, the flexibility of the rod 17 causes its end to dip or lower. Even a slight movement will release enough tension in cord 15 to allow the natural resiliency of the arm 33 to spring the arm back into contact with the contact bar lower member 29, as shown by the dotted lines in FIG. 2. Contact of the arm 33 with either the lateral member 27 or 29 serves as a switch to close the circuit to actuate lamp 41 and buzzer 43. The battery 47, buzzer 43, lamp 41, and wires 39, 45 and 49 serve as electrical signal means for providing a signal when the arm 33 is in electrical contact with the contact bar 25. Buzzer 43 provides an audible signal and lamp 41 provides a visual signal. Vibrating buzzer 43 also provides a signal that can be felt by one touching the buzzer or touching the ground close to where the buzzer is placed.

The rod 17 serves as holding means for maintaining the cord sufficiently taut to draw the lever arm away from the contact bar 25. Other holding means are available. For example, in the case of a tightly strung trotline (not shown), cord 15 could be tied between the trotline and the eyelet 35. The trotline will be tightly strung between two points. A number of hooks will be suspended from the trotline on individual lines. The device could be placed on the bank, with cord 15 running substantially perpendicular to the trotline, and horizontally. The device 11 could be placed on its side so that the tautness of cord 15 connected to the trotline keeps arm 33 from contacting contact bar member 29. Movement toward the detector 11 by fish tending to drag the trotline would cause the arm 33 to spring back into contact with the contact bar member 29. Corresponding movement away from the device 11 pulls the contact arm 33 into contact with contact bar member 27.

With a loose trotline (not shown), laid on the bottom, a weight (not shown) could serve as the holding means. In this case, the operator should bend the arm 33 so that it becomes naturally biased into contact with the upper member 27, rather than with the contact bar lower member 29, as is used with rod fishing. The device 11 is located on the bank and the cord 15 is tied to the weight and arm 33. The weight is submerged at the edge of the bank in order to pull the arm 33 out of contact with upper member 27. Cord 15 is also secured to the loose trotline. A fish dragging the loose trotline will eventually disturb the weight, causing tension to be released in cord 15, allowing the arm 33 to contact the upper member 27.

It should be apparent that an invention having significant improvements has been provided. The device does not require the fishing line to be looped through a portion of it. It is sensitive since it relies on the rod movement and a release in tension, rather than overcoming a bias to cause contact, as is shown in many of the prior art patents. The upper and lower members of the contact bar avoid placing too much tension in the cord, and also allows use with trotlines where a rod is not used.

It can be understood that the lamp 41 allows the deaf to use the device to enable them to fish and the vibrating buzzer 43 allows the blind to use the device for fishing purposes. Moreover, the vibrating buzzer 43 allows a person who is deaf and blind to use the device to fish since he can feel the vibrations from the buzzer 43 if it is actuated.

While the invention has been shown only one of its forms, it sould be apparent to those skilled in the art that it is not so limited but is susceptible to various changes and modifications without departing from the spirit thereof.

I claim:

1. An apparatus for signaling the bite of a fish on a fishing line, comprising;
   a housing;
   a contact means mounted to the housing;
   an arm mounted to the housing adjacent to said contact means, the arm being biased toward the contact means so that it is in electrical contact with the contact means while in its natural state;
   electrical signal means mounted in the housing and electrically connected to the arm and contact means for providing a signal when the arm is in electrical contact means; and
   a cord secured between the end of the arm and a holding means for maintaining the cord sufficiently taut to draw the arm away from the contact means, the holding means being responsive to a jerk on the fishing line to release tension on the cord to allow the arm to contact the contact means to provide a signal.

2. The apparatus according to claim 1 wherein the contact means comprises upper and lower members, with the arm disposed between said upper and lower members and in contact with one of said upper and lower members while in its natural state, the upper and lower member both being electrically connected to the electrical signal means, so that contact of the arm with the upper member or with the lower member provides a signal, said cord being secured between the end of the arm and said holding means for maintaining the cord sufficiently taut to draw the arm away from said one of said upper and lower members, said holding means being responsive to a jerk on the fishing line to release tension on the cord to allow the arm to contact said one of said upper and lower members to provide a signal.

3. The apparatus according to claim 1 wherein the holding means comprises a fishing rod.

4. An apparatus for signaling the bite of a fish on a fishing line of a fishing rod, comprising:
   a housing having a slot in one end;
   a contact means mounted in the housing and extending outward through the slot;
   an arm mounted in the housing and extending outward through the slot over the contact means, the arm being a metal strip that is resilient and mounted so that it contacts the contact means when it is in its natural state;
   electrical signal means mounted in the housing and electrically connected to the contact means and arm for providing a signal when the arm is in electrical contact with the contact means; and
   a cord secured between the fishing rod and the end of the arm, the fishing rod being positioned so as to maintain the cord sufficiently taut to draw the arm away from the contact means, so that movement of the rod due to the bite of a fish releases tension on the cord to allow the arm to contact the contact means to provide a signal.

5. The apparatus according to claim 4 wherein the contact means comprises upper and lower members, with the arm disposed between said upper and lower members and in contact with one of said upper and lower members while in its natural state, the upper and lower members both being electrically connected to the electrical signal means, so that contact of the arm with the upper member or with the lower member provides a signal, said cord being secured between the fishing rod and the end of the arm, the fishing rod being positioned so as to maintain the cord sufficiently taut to draw the arm away from said one of said upper and lower members, so that movement of the rod due to the bite of a fish releases tension on the cord to allow the arm to contact said one of said upper and lower members to provide a signal.

6. An apparatus for signaling the bite of a fish on a fishing line of a fishing rod, comprising:
   a housing having a slot in one end;
   a contact bar mounted in the housing and extending outward through the slot, the contact bar having first and second lateral members extending at a right angle from it, the first and second lateral members being in electrical contact with the contact bar and being spaced apart from each other;
   an arm mounted in the housing and extending outward through the slot and between the first and second lateral member, the arm being a metal strip that is resilient and mounted so that it contacts one of said lateral member of the contact bar when it is in its natural state;
   electrical signal means comprising a lamp and a vibrating buzzer mounted in the housing and electrically connected to the contact bar and arm for providing a signal when the arm is in electrical contact with the first or second lateral members of the contact bar; and
   a cord adapted to be secured between the fishing rod and the end of the arm, the fishing rod being mounted in a rod holder and positioned so as to maintain the cord sufficiently taut to draw the arm away from said one lateral member of the contact bar, so that movement of the rod due to the bite of a fish releases tension in the cord to allow the arm to spring back into contact with said one lateral member of the contact bar to provide a signal.

* * * * *